United States Patent Office 3,169,402
Patented Feb. 16, 1965

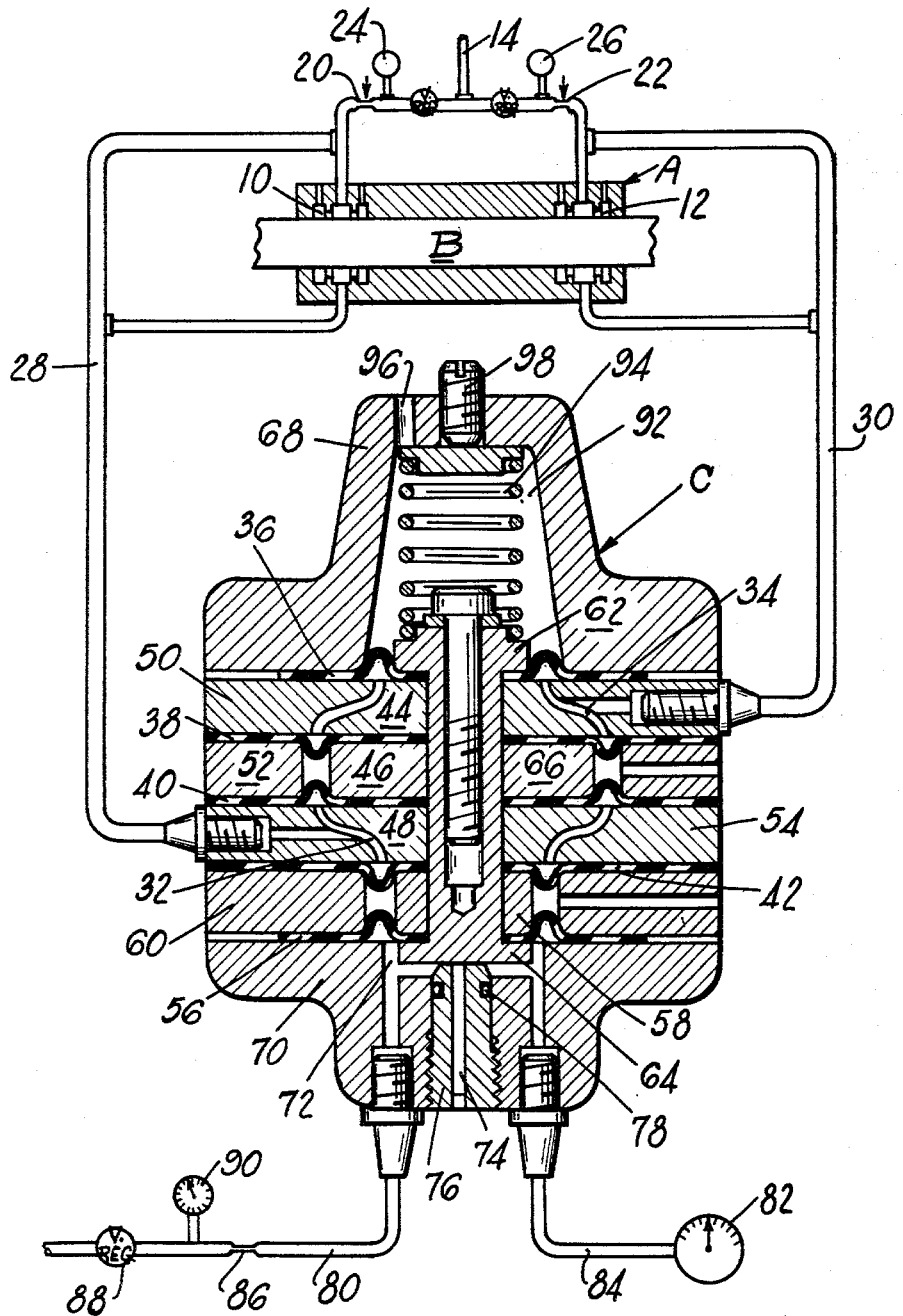

3,169,402
PRESSURE DIFFERENTIAL GAGE
Ralph C. Baker, Littleton, Colo., assignor to The Sheffield Corporation, Dayton, Ohio, a corporation of Delaware
Filed Aug. 16, 1961, Ser. No. 131,933
1 Claim. (Cl. 73—407)

The present invention relates to systems and devices for sensing the difference in pressure between two pressure sources.

In the type of system with which we are concerned, a pair of variable pressure sources are communicated to a pair of opposing movable wall structures which will provide an unbalance in force depending upon the difference in pressure between the sources. This unbalance of force is used to throttle fluid flow through a nozzle to provide a back pressure which varies in accordance with the unbalanced force produced by the opposing movable wall structures. The back pressure which is created by the throttling of the fluid flow through the nozzle provides a direct indication of the difference in pressure between the two pressure sources. Such systems have particular utility in air gaging circuits for determining size differences at different points of work being gaged.

While the prior art has provided structures and systems which will provide a differential pressure indication, they have lacked the responsiveness, continuing accuracy and durability that is demanded in the production air gaging of finished machine parts. One typical prior art structure is found in the C. B. Moore Patent 2,520,468. In the structure of the moore patent, each of a pair of opposing chambers is formed by a pair of radially inner and outer bellows. These bellows are suitably sealed and connected together by an axially extending centrally located hub or rod so that the difference in pressure between the two opposing annular chambers formed by the bellows causes an axial movement of the centrally located hub. Movement of this hub is generally used to throttle flow out of a pressure jet caused to impinge upon one end of the hub so as to produce a back pressure.

However, bellows of the type shown and disclosed in the Moore patent have an appreciable spring rate which causes the back pressure that is produced by the jet or nozzle to be somewhat nonlinear, and found that the effective area of a bellows changes with movement or position of the bellows. This being true, a slight indication in differential pressure will be indicated by the device when a common pressure is supplied to the opposing chambers and the intensity of this common pressure is varied. This phenomenon has been termed "zero shift", and is brought about principally because of the change in effective area of the bellows as they are extended or compressed. The bellows type of instrument is also subject to permanent distortion if subjected to high pressures.

In accordance with the present invention it is possible to position a plurality of generally parallel flexible interconnected diaphragms which are axially positioned at a mean central position wherein substantially no zero shift occurs when a variable common pressure is communicated to the opposing diaphragm chambers. By the use of essentially parallel flexible diaphragms and with a biasing means or spring serving as substantially the sole counter balancing force opposing the back pressure created by the nozzle, and with a nozzle adjustable to produce no zero shift the throttling surface that is attached to the opposing movable wall structure can be caused to assume a mean centered position in an axial direction for the movable wall structures at the same time that the throttling surface is at a distance from the nozzle providing a linear throttling response for the nozzle.

A principal object of the present invention, therefore, is the provision of a new and improved differential force balancing system or device which will have good linearity with the elimination of "zero shift" errors through out its operating range.

A further object of the present invention is the provision of a new and improved system or structure of the above described type which is simple in design, rugged in construction, and efficient in its operation.

The invention resides in certain constructions, combinations, and arrangements of parts; and further objects and advantages of the invention will become apparent to those skilled in the art to which it relates from the following description of the preferred embodiment described with reference to the accompanying drawing showing a differential air gaging circuit, and showing a preferred arrangement of force balance device embodying principles of the present invention for indicating the differential pressure between two variable pressure gaging sources.

The differential air gage of the present invention is shown in a circuit including a gage head A having spaced apart gaging restrictions 10 and 12 cooperating with a workpiece B whose dimensions are to be sensed by the gaging head A. The gaging restrictions 10 and 12 may be of any conventional construction and provide a back pressure to air flowing through the gage which is indicative of the clearance between the work piece and the respective gaging restriction. Air flow is supplied to the respective restrictions 10 and 12 from a supply line 14 of high pressure air. Air from the supply line 14 passes through respective pressure regulators 16 and 18 which produce a controlled pressure flow through respective variable flow restricting valves 20 and 22 to respective gaging restrictions 10 and 12. Variable restricting valves 20 and 22 may be of any suitable type adapted to provide small flows, and will generally be adjusted to provide a discharge pressure of the order of 15 p.s.i. when the their respective gaging restrictions are sensing a clearance that is midway between the extreme limits which is intended to be gaged. Conventional pressure gages 24 and 26 may be used to indicate the discharge pressure of the respective regulators 16 and 18 which in turn supply the variable flow restricting valves 20 and 22. The back pressures which are produced at respective gaging restrictions 10 and 12 are communicated through the respective sensing lines 28 and 30 to a pressure differential sensing device C which is constructed in accordance with the principles of the present invention, and which will now be described.

The pressure differential sensing device C shown in the drawings generally comprises two pressure chambers 32 and 34 to which the sensing lines 28 and 30 are respectively connected. While each of these pressure chambers may have one pressure responsive diaphragm it is preferred that each chamber have two movable walls or diaphragms of different effective diameter to increase the effectiveness of operation thus the chamber 34 is formed by a small diameter diaphragm 36 and large diameter diaphragm 38; and the chamber 32 is formed by a large diameter diaphragm 40 and small diameter diaphragm 42 which are spaced apart in that order so as to produce forces which oppose each other. Inner portions of the diaphragms are sealingly clamped between a plurality of spacers 44, 46 and 48, preferably molded of suitable plastic material, and the outer peripheries of the various diaphragms are sealingly clamped between various annular plates 50, 52 and 54, preferably of plastic, which have the same axial thickness as the internal spacers 44, 46 and 48. An additional diaphragm 56 is positioned opposite the bottom diaphragm 42, for reasons which will later be explained, and is in turn spaced from the diaphragm 42 by means of an inner plastic spacer 58 and outer plastic plate 60. The center portions of the upper and lower diaphragms 36 and 56 are abutted by hold down members 62 and 64; and the various internal spacers and diaphragm portions are clamped together by means of a threaded bolt 66 which serves with the several spacers as an interconnection and suitably clamps the hold-down members together to form a central hub structure. The outer periphery of the upper and lower diaphragms 36 and 56 are abutted by upper and lower cover members 68 and 70 respectively. The outer plates and the edges of the diaphragms are sealingly clamped together by suitable through bolts which extend through the cover members and which are not shown.

The bottom diaphragm 56 and cover 70 form a back pressure compartment 72 providing a pressure force which will act upwardly, as shown, in opposition to down forces on the central hub structure. The bottom surface of the lower hold-down member 64 forms an anvil or throttling surface for partially closing off the central passage 74 of an adjustable orifice or nozzle member 76 which is suitably threaded into the lower cover member 70 so its end faces and is close to the anvil surface. A suitable sealing ring 78 is provided between the adjustable nozzle member 76 and the cover member 70 to assure that all of the air flow out of the compartment 72 will be through the central opening 74 and be throttled by the anvil surface.

A regulated supply of air is communicated through the line 80 to the compartment 72; and the pressure which is established in the compartment 72 by reason of the throttling of the flow out of the escape nozzle 76 is registered on a pressure sensitive gaging member such as a gage 82 that is also connected to the compartment 72 through the conduit 84. The flow of air to the compartment 72 is supplied from a fixed restrictor 86 whose supply pressure is regulated by a suitable pressure regulator 88. The supply system may further include the pressure gage 90 for indicating the supply pressure to the restrictor 86. The pressure differential sensing device C is provided with means producing a constant biasing of the central hub structure towards the adjustable nozzle 76. This biasing means is preferably a spring 94 arranged in the internal chamber 92 in the top cover member 68. An adjusting screw 98 is operable to change the position of the spring 94. Atmospheric passages 96 are provided for communicating atmosphere to the space between diaphragms 38 and 40, 42 and 56, and to chamber 92.

The diaphragms 36, 38, 40, 42 and 56 are of a type that have only a very small spring rate but in which the spring rate is substantially constant in distinction from a flat diaphragm and from a corrugated metal bellows. The diaphragms are preferably made of rubber impregnated fabric having a reversely curved annular groove or pocket connecting the outer and inner substantially flat portions. It is in these reversely curved portions that the deflections or movements take place and during movement of the diaphragm of this type there is no change in the effective area. Also since the spacers between diaphragms nearly fill up the space between diaphragms the air space is small and the device responds quickly to pressure changes in the applied pressures.

Before the unit is placed in operation, it is calibrated to eliminate any "zero shift" error by supplying a common pressure of about 15 p.s.i. to both of the compartments 32 and 34, and then adjusting the position of the nozzle member 76 until a mid-range indication is provided on the indicating pressure gage 82. Thereafter the common pressure which is admitted to both the compartments 32 and 34 should be increased or decreased slightly, and the pressure then read on the gage 82. If the new reading on the gage 82 decreases with an increase in pressure in the pressure chambers the orifice member 76 should be closer to the hub structure. On the other hand, if the pressure indicated by the gage 82 increases with an increase in differential pressure supplied to the compartments 32 and 34 the orifice member should be further away from the hub structure. By appropriately adjusting the setting of the orifice member 76 and the adjustment 98 of the spring 94 until no change in pressure is registered on the gage 82 when the common pressure that is supplied to compartments 32 and 34 is varied, the several diaphragms will be arranged in a mean centered position and any "zero shift" error is eliminated. After calibration the unit installed in the circuit will indicate the difference in pressures applied to the pressure chambers 32 and 34 by the readings on the pressure gage 82, and show size differences at the spaced points of the workpiece B to provide an indication of its taper for example.

It will be apparent that the objects heretofore enumerated as well as others has been accomplished; and that there has been provided means for measuring the differential pressure between two variable pressure sources in a manner which is very accurate and with a linear response throughout its operating range, and which has no "zero shift" due to pressure variations.

While the invention has been described in considerable detail, I do not wish to be limited to the particular construction shown and described; and it is my intention to cover hereby all novel adaptations, modifications and arrangements thereof which come within the practice of those skilled in the art to which the invention relates.

What is claimed is:

In a differential pressure sensing device for accurately sensing the difference in pressure between two pressure signals: a housing member having an axially extending internal chamber, an axially extending hub structure in said chamber, a first pair of flexible diaphragms extending across said chamber between said housing and hub structure to form a first variable pressure compartment, a second pair of flexible diaphragms extending across said chamber between said housing and hub structure to form a second variable pressure compartment, the diaphragms of each pair having different effective areas and said pairs being arranged to produce forces on said hub structure which oppose each other, each of said diaphragms having a peripheral interconnection between the effective area thereof and said housing formed of rubber-like material having an annularly extending curved portion in which substantially all deflections take place, an escape nozzle positioned adjacent one end of said hub structure to be throttled thereby, a spring engaging the other end of said hub structure biasing said hub structure towards the end of said escape nozzle, said nozzle being adjustable toward and away from said hub structure, a fifth flexible diaphragm extending across said chamber between said housing and hub structure to form a back pressure compartment which includes said escape nozzle, a conduit adapted for connection to a pressure regulated air supply, a restriction in said conduit, and means for supplying air under pressure from said restriction to said back pressure compartment, said spring urging said hub structure towards said escape nozzle so that increase in pressure in said back pressure compartment moves said hub structure away from said nozzle, and said escape nozzle being adjustable toward and away from said hub structure to bring the throttling range of said hub structure with respect to said nozzle to a position coincident with a position establishing a mean centered position of said diaphragms, and pressure sensing means connected to said back pressure compartment.

References Cited in the file of this patent
UNITED STATES PATENTS

| | | |
|---|---|---|
| 2,312,201 | Thompson et al. | Feb. 23, 1943 |
| 2,584,455 | Hughes | Feb. 5, 1952 |
| 2,659,381 | Seljos | Nov. 17, 1953 |
| 2,984,374 | Jensen | May 23, 1961 |